June 7, 1932.    W. SHAW    1,861,512
COTTON FEEDING MECHANISM
Filed Feb. 26, 1930
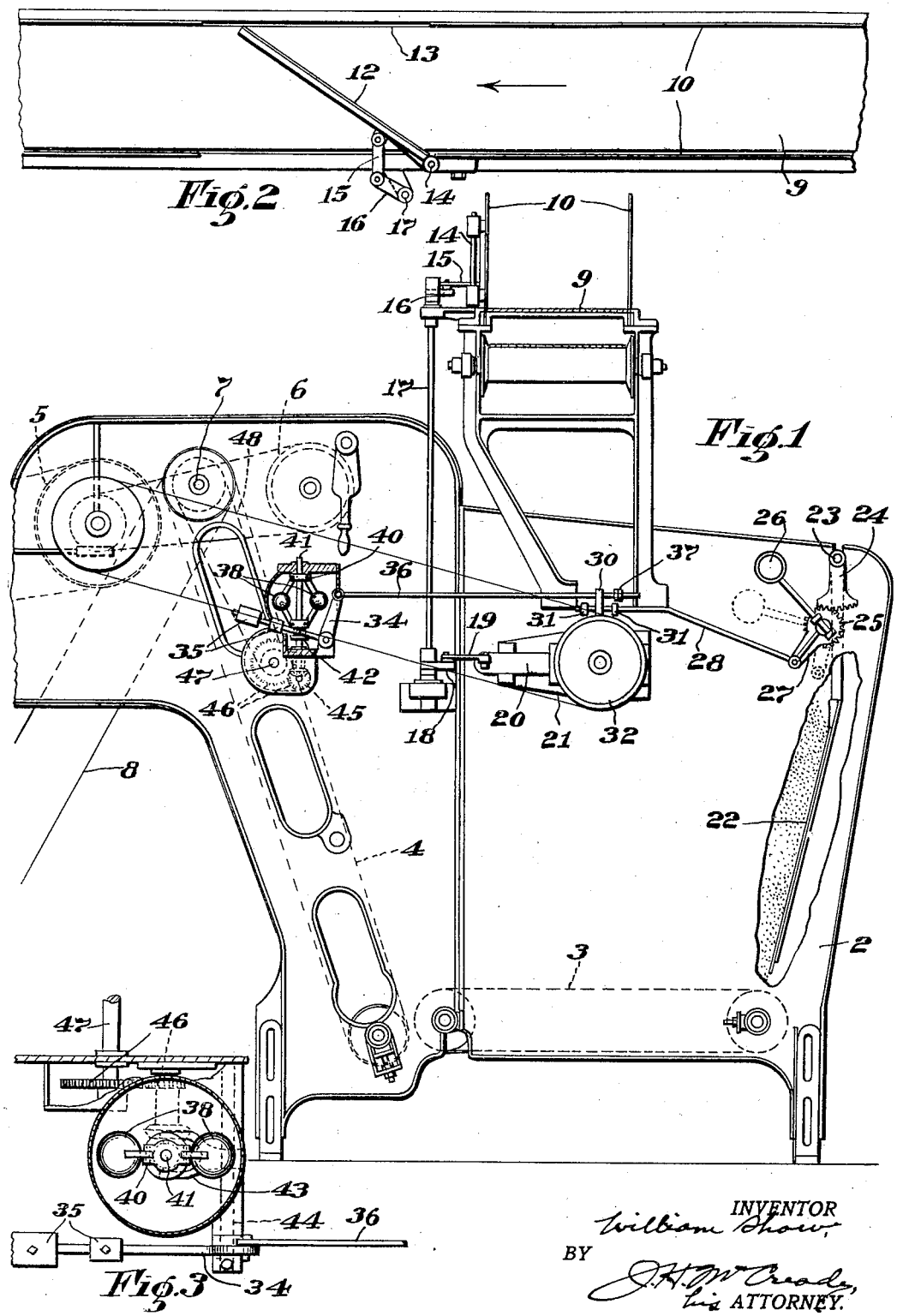

Patented June 7, 1932

1,861,512

UNITED STATES PATENT OFFICE

WILLIAM SHAW, OF NEEDHAM, MASSACHUSETTS, ASSIGNOR TO SACO-LOWELL SHOPS, OF NEWTON, MASSACHUSETTS, A CORPORATION OF MASSACHUSETTS

COTTON FEEDING MECHANISM

Application filed February 26, 1930. Serial No. 431,535.

This invention relates to mechanisms for distributing and feeding cotton.

In a modern cotton mill the bales of cotton usually are opened in the warehouse, or at a point some distance away from the picker room. The cotton first goes through a bale breaker and then through a series of opening and cleaning machines, after which it is delivered to the picker room where it is distributed by automatic conveying mechanism to the various pickers. In a typical installation the pickers are arranged in rows, each row having, say, from four to eight machines, and all of the machines in a single row are supplied with cotton by a single conveyor.

The delivery of the cotton by the conveyor to the individual machines in each series is controlled automatically in accordance with the requirements of the respective machines. A well known mechanism for performing this function is known commercially as the Morton distributor. It includes a conveyor for delivering cotton to a series of pickers, and each picker unit includes a feed hopper equipped with a feeler or rake which controls a power operated mechanism for swinging a gate across the conveyor belt to divert cotton into its respective hopper. The arrangement is such that the gate remains open or in its cotton diverting position so long as that particular hopper requires cotton, and when the needs of that machine have been satisfied the feeler operates to cause the closing of the gate.

Mechanisms of this kind have long been used and are extremely reliable under most circumstances. The picker units supplied from a given feed hopper are usually organized to produce a lap, and are arranged to "knock off" or stop the entire feed of cotton when a lap has been completed. If the feeding of cotton from an individual hopper is stopped when the gate for that hopper is open, and cotton, therefore, is being fed into it, it sometimes happens that the feeler or fork in the hopper will not be actuated by the increased weight of cotton, and the gate will remain open indefinitely. This results in overflowing the hopper, and in the meantime one or more machines farther down the line may be calling for cotton. Occurrences of this kind have been relatively rare heretofore but they have become more frequent in very recent times since it has become a common practice to open and clean the cotton more thoroughly before delivering it to the pickers.

The present invention deals with these conditions, and it aims to improve cotton feeding mechanisms with a view to making them more reliable, and particularly with the object of preventing the excessive feeding of cotton to an individual picker in the manner above described.

The manner in which it is proposed to accomplish this object will be readily understood from the following description when read in connection with the accompanying drawing, and the novel features will be particularly pointed out in the appended claims.

In the drawing,

Figure 1 is a side view, partly in section, of those parts of a cotton feeding and distributing mechanism with which this invention is more especially concerned;

Fig. 2 is a plan view of the distributor conveyor and the gate associated therewith; and Fig. 3 is a plan view, partly in section, showing certain details of the governor mechanism illustrated in Fig. 1.

The construction shown in the drawing comprises a hopper feeder of a common form including a hopper 2, a horizontal lattice or apron 3 in the bottom of the hopper, and an inclined feed lattice or apron 4 equipped with pins for feeding the cotton out of the hopper. The doffer roll is shown at 5 and the stripper roll at 6. Usually the lifting apron 4 is driven from the upper shaft 7 by a belt or chain 8. This is a common construction of hopper feeder.

The drawing shows this feeder in connection with a Morton distributor but modified in accordance with the disclosure in applicant's prior Patent No. 1,735,135, assigned to the assignee of this invention. As here illustrated the mechanism includes a conveyor belt 9 running between side plates or guides 10—10. A gate 12 is located above the feed hopper to divert cotton from the belt through a gap 13 in one of the guides 10 into the hopper 2. This gate is mounted to swing on a pivot 14, and in order to swing it, it is connected by a link 15 with an arm 16 secured on the upper end of a vertical rock shaft 17. The lower end of this rock shaft has an arm 18 secured to it and connected by a link 19 to the slide 20 of a reversible power driven unit 21. This unit is under the control of a feeler fork 22 in the hopper 2, the feeler being mounted on a horizontal rock shaft 23 in the upper edge of the hopper. A toothed sector 24 is secured to this rock shaft and meshes with a pinion 25 carrying a weight 26 which operates through the connections just described to urge the feeler or fork 22 forward against the weight of cotton in the hopper. An arm 27 rigid with the pinion 25 is connected by a link 28 to the control lever 30 of the power operated unit 21, this rod extending through a hole in the lever 30 and being equipped with adjustable collars 31—31 at opposite sides of the lever through which the feeler can rock the control lever 30 either to the right or left.

For a complete description of the construction and operation of the power driven unit reference should be made to my prior patent above designated. For present purposes it is sufficient to state that when the supply of cotton in the hopper 2 becomes depleted, the weight 26 operates through its connections with the feeler to swing the feeler forward. This results in swinging the control lever 30 toward the right, whereupon the power driven unit is brought into operation and moves the slide 20 positively in such a direction as to swing the gate 12 across the belt 2 into its open position. The pulley 32 of this unit is driven continuously, usually by a belt connection with the shaft of the doffer roll 5.

The cotton is delivered very rapidly to the hopper 2 and when the weight of cotton in the hopper has been increased to substantially a predetermined degree, the feeler fork is swung backwardly into its initial position, thus moving the control lever 30 to the left and causing the power driven unit 21 to close the gate 12 again.

As above indicated, this mechanism is extremely reliable in operation and is very sensitive so long as the feed lattices 3 and 4 are working, these lattices serving to agitate the mass of cotton in the hopper and to give it more or less of a rolling motion against the feeler. When, however, the lapper supplied with cotton from the hopper 2 knocks off, the driving belt 8 then is stopped and consequently the aprons 3 and 4 stop, although the doffer and stripper rolls 5 and 6 continue to operate uninterruptedly. If this knock-off action occurs when the gate 12 is open and cotton is being delivered to the hopper 2, the feeler may fail to operate, with the results above described.

In order to stop the delivery of cotton to the hopper under these circumstances the invention provides an additional mechanism which is arranged to take control of the lever 30 temporarily away from the feeler mechanism when the feed apron 4 stops, and to move said lever in such a direction as to cause the power driven unit 21 to close the gate 12. This additional mechanism includes a bell crank lever 34 carrying adjustable weights 35 and connected by a rod 36 with the control lever 30, the rod extending through said lever and having collars 37 adjustably mounted on it at the right-hand side of the lever 30. The weights 35 have sufficient mass to operate through the lever 34 and rod 36 to swing the lever 30 toward the left and thus to cause the power driven unit 21 to close the gate 12.

For the purpose of restoring the control of the power driven unit to the feeler mechanism when the feed lattices are again started up, a centrifugal governor mechanism is provided comprising two weighted arms 38 both pivoted on a yoke 40 which is fixed to a vertical revolving spindle or shaft 41. These arms are connected by links to a sliding collar 42 which is grooved to receive pins or rolls projecting inwardly from the arms of a fork 43 that straddles the collar 42, this fork being secured on a rock shaft 44 on which the bell crank lever 34 also is fastened. The governor shaft 41 is driven through bevel gears 45 and spur gears 46, one of the latter gears being mounted on a shaft 47 which is driven by a chain or belt connection 48 with the upper apron shaft 7.

Due to this arrangement the governor mechanism serves, so long as the apron 4 is in motion, and therefore is feeding cotton out of the hopper, to hold the weights 35 in an elevated position where they can have no effect on the control of the power driven unit 21. In other words, the governor mechanism restrains the weights from acting so long as the feed apron is in operation. But when the feed apron stops, the governor mechanism also stops and then permits the weights 35 to act on the control lever 30, if this lever is in such a position as to cause the gate 12 to be held open. This additional mechanism, however, comes into operation only when it is needed and does not normally interfere in any way with the functions of the feeler or fork 22 and the parts connected therewith or controlled thereby.

The invention thus provides a relatively simple and extremely reliable mechanism for avoiding the excessive delivery of cotton to a hopper, due to the failure of the ordinary control mechanism to operate. The mechanism provided for the purpose requires practically no attention when once properly adjusted except occasional lubrication. In this arrangement also the supplemental or safety control mechanism forms a part of the hopper feeder so that the whole organization is self-contained. The operation of the safety mechanism is controlled simply by the operation of the mechanism which feeds cotton out of the hopper. Arrangements have been proposed heretofore in which the control of the safety mechanism was made dependent upon the operation of some distant machine. The present arrangement finds a wider application because of the fact that it can be used not only in most, if not all, of those locations where these prior constructions were useful, but also in other situations where prior constructions are not satisfactory. It is also less liable to get out of order.

While I have herein shown and described a preferred embodiment of my invention, it will be understood that the invention may be embodied in other forms without departing from the spirit or scope thereof.

Having thus described my invention, what I desire to claim as new is:

1. In a cotton handling mechanism, the combination of a hopper, mechanism for feeding cotton from said hopper, means for supplying cotton to said hopper, mechanism for automatically controlling the delivery of cotton to said hopper by said means in response to changes in the quantity of cotton in the hopper, and additional means under the control of said feeding mechanism for automatically causing the delivery of cotton to the hopper to be stopped when said feeding mechanism is stopped.

2. In a cotton handling mechanism, the combination of a hopper, mechanism for feeding cotton from said hopper, means to drive said mechanism, means for supplying cotton to said hopper, mechanism for automatically controlling the delivery of cotton to said hopper by said means in response to changes in the quantity of cotton in the hopper, additional means for interrupting the feed of cotton into said hopper, and mechanism under the control of said driving means, for preventing said additional means from operating so long as said feeding mechanism remains in operation but permitting said additional means to operate when the feeding mechanism stops.

3. In a cotton handling mechanism, the combination of a hopper, mechanism for feeding cotton out of said hopper, means for delivering cotton to said hopper, automatic mechanism for controlling such delivery in accordance with variations in the supply of cotton in the hopper, and supplying means arranged to operate through said automatic mechanism for preventing the delivery of cotton to the hopper when said feeding mechanism is stopped.

4. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, mechanism for operating said gate automatically in response to variations in the supply of cotton in the hopper, and additional means arranged to operate through said automatic mechanism to close said gate when said feeding mechanism stops.

5. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, mechanism for operating said gate automatically in response to variations in the supply of cotton in the hopper, additional means arranged to operate through said automatic mechanism to close said gate, and power driven mechanism for preventing said additional means from operating so long as said feeding mechanism remains in operation.

6. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, power driven mechanism for moving said gate into either an open or closed position, a feeler mechanism controlling the operation of said gate by said power driven mechanism in response to variations in the supply of cotton in said hopper, and additional means operative automatically through said power driven mechanism to effect the closing of said gate when said feeding mechanism stops.

7. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, a power driven unit for moving said gate into and out of its cotton diverting position, a feeler mounted in said hopper and movable in response to variations in the weight of cotton therein, said unit including a control lever, connections between said feeler and said lever whereby the feeler is operative to control the adjustment of said gate, and additional means for operating said lever automatically to cause said unit to close said gate when said feeding mechanism stops.

8. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, a power driven unit for moving said gate into and out of its cotton diverting position, a feeler mounted in said hopper and movable in response to variations in the weight of cotton therein, said unit including a control lever, connections between said feeler and said lever whereby the feeler is operative to control the operation of said gate, additional means for operating said lever automatically to cause said unit to close said gate, and means for preventing said additional means from operating substantially so long as said feeding mechanism remains in operation.

9. In a cotton handling mechanism, the combination of a hopper, mechanism for feeding cotton out of said hopper, distributing means including a conveyor for delivering cotton to said hopper, mechanism for automatically controlling the delivery of cotton to said hopper by said distributing means in response to changes in the quantity of cotton in the hopper, additional means for automatically assuming control over the delivery of cotton to said hopper when said feeding mechanism stops, and mechanism for restraining said additional means from operating so long as said feeding mechanism is in operation but permitting said additional means to operate when said feeding mechanism stops.

10. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, a power driven unit for moving said gate into and out of its cotton diverting position, a feeler mounted in said hopper and movable in response to variations in the weight of cotton therein, said unit including a control lever, connections between said feeler and said lever whereby the feeler is operative to control the operation of said gate, and additional means for taking control of said lever away from said feeler when said feeding mechanism stops and for restoring control again to said feeler when the feeding mechanism starts up.

11. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, a power driven unit for moving said gate into and out of its cotton diverting position, a feeler mounted in said hopper and movable in response to variations in the weight of cotton therein, said unit including a control lever, connections between said feeler and said lever whereby the feeler is operative to control the operation of said gate, additional means for operating said lever automatically to cause said unit to close said gate, a centrifugal mechanism for controlling the operation of said additional means, and connections between said centrifugal mechanism and said feeding mechanism for driving the centrifugal mechanism.

12. In a cotton handling mechanism, the combination of a hopper, mechanism for feeding cotton out of said hopper, means for delivering cotton to said hopper comprising a conveyor and a gate movable into and out of position to divert cotton from said conveyor into said hopper, a power driven unit for moving said gate into and out of its cotton diverting position, a feeler mounted in said hopper and movable in response to variations in the weight of cotton therein, said unit including a control lever, connections between said feeler and said lever whereby the feeler is operative to control the operation of said gate, additional means for operating said lever automatically to cause said unit to close said gate, a governor mechanism for acting on said additional means to restrain its action on said lever, and connections between said governor mechanism and said feeding mechanism for driving the governor mechanism, whereby when said feeding mechanism is stopped said governor mechanism will permit said additional mechanism to operate said lever to cause the closing of said gate.

13. In a cotton handling mechanism, the combination with a hopper, mechanism for feeding cotton from said hopper, means to drive said mechanism, means for supplying cotton to said hopper, and mechanism for automatically controlling the delivery of cotton to said hopper by said means in response to changes in the quantity of cotton in the hopper, of additional power driven mechanism under the control of said driving means for controlling said cotton supplying means and operative automatically to ensure the stopping of the delivery of cotton to the hopper when said feeding mechanism is stopped.

14. In a cotton handling mechanism, the combination with a hopper, mechanism for feeding cotton from said hopper, means for supplying cotton to said hopper, and mechanism for automatically controlling the delivery of cotton to said hopper by said supplying means in response to changes in the quantity of cotton in the hopper, of a centrifugal mechanism connected with said cotton feeding mechanism to be driven while the latter mechanism is in operation, and means under the control of said centrifugal mechanism for ensuring the stopping of the delivery of cotton to the hopper by said cotton supplying means when said feeding mechanism is stopped.

WILLIAM SHAW.

CERTIFICATE OF CORRECTION.

Patent No. 1,861,512.  June 7, 1932.

WILLIAM SHAW.

It is hereby certified that error appears in the printed specification of the above numbered patent requiring correction as follows: Pages 3 and 4, lines 41 and 103, claims 2 and 13, respectively, before the word "means" insert the word supplying, and lines 57 and 116-117, claims 3 and 14, strike out the word "supplying"; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.